United States Patent
Mori et al.

(10) Patent No.: US 6,502,611 B1
(45) Date of Patent: Jan. 7, 2003

(54) PNEUMATIC RACING CART TIRE AND MANUFACTURING METHOD THEREOF

(75) Inventors: Shinichi Mori, Hiratsuka (JP); Masaharu Sekoguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/504,079

(22) Filed: Feb. 15, 2000

(30) Foreign Application Priority Data

Feb. 23, 1999 (JP) ............................................. 11-045330

(51) Int. Cl.$^7$ ............................ B29D 30/52; B60C 3/04; B60C 11/00
(52) U.S. Cl. ................................ 152/209.1; 152/209.5; 152/209.14; 152/454; 152/559; 156/128.1; 156/129
(58) Field of Search ............................. 152/209.1, 209.5, 152/209.6, 454, 559, 209.14; 156/128.1, 128.6, 129

(56) References Cited

U.S. PATENT DOCUMENTS

| | | | | |
|---|---|---|---|---|
| 2,600,231 A | * | 6/1952 | Ewart | |
| 2,672,914 A | * | 3/1954 | Weigold et al. | |
| 3,628,586 A | * | 12/1971 | Curtiss | |
| 3,765,977 A | * | 10/1973 | Knight | |
| 4,967,817 A | * | 11/1990 | Boehmer et al. | |
| 5,017,118 A | * | 5/1991 | Looman et al. | |
| 5,025,845 A | * | 6/1991 | Iino et al. | |
| 5,882,457 A | * | 3/1999 | Currie et al. | |

FOREIGN PATENT DOCUMENTS

| | | | |
|---|---|---|---|
| JP | 4-201605 | * | 7/1992 |
| JP | 5-16608 | * | 1/1993 |
| JP | 8-244403 | * | 9/1996 |
| WO | WO 98/58810 | * | 12/1998 |

* cited by examiner

Primary Examiner—Steven D. Maki
(74) Attorney, Agent, or Firm—Rader, Fishman & Grauer PLLC

(57) ABSTRACT

Disclosed is a pneumatic tire adopting a bias ply structure in which plural carcass layers are disposed so that cords cross each other between the layers, and having an aspect ratio of 55% or less and an outer diameter of 300 mm or less, wherein a cord angle to a tire circumferential direction of said carcass layer is set to a range from 27 to 37° in the center line position, and a surface shape of a tread portion is formed to be straight to a tire width direction in the region of 60 to 75% of a tread width.

4 Claims, 3 Drawing Sheets

PNEUMATIC RACING CART TIRE AND MANUFACTURING METHOD THEREOF

BACKGROUND OF THE INVENTION

The present invention relates to a preferred pneumatic tire for use in a racing cart and to a manufacturing method thereof, more particularly, to a pneumatic tire designed so as to maximize its footprint area in an inflated state with inflation pressure (inflated state) and to prevent an expansion and growth of the outer diameter at high speed running and to a manufacturing method thereof.

A bias tire for use in a racing cart and the like generally has a low aspect ratio and a wide tread width and is set to have a cord angle of 40 ° or less of a carcass layer to a tire circumferential direction. However, differing from a radial tire, since a belt member pressing a footprint is not laid in a tread portion of a bias tire, a tread radius on a tire meridian section deforms to be small in an inflated state, whereby a footprint width tends to be small. And, when the footprint width becomes small, driving stability is lowered.

In order to control the above-described reduction of the footprint width, employing the following tread shapes has been proposed: a tread shape including its tread center portion made to cave by giving a counter radius expanding to the inside of the tire on the surface of the tread portion; or a tread shape combined with a counter radius expanding to the inside of the tire and a normal radius expanding to the outside of the tire.

However, a tread shape including the foregoing counter radius has not enabled a footprint area to be fully enlarged since the tread surface becomes uneven in an inflated state. Moreover, in a bias tire for use in a racing cart and the like, although the foregoing tread shape is employed, effects of controlling an expansion and growth of the outer surface are also insufficient since the tread portion expands to the outside of the tire diameter direction due to a centrifugal force at high speed running.

SUMMARY OF THE INVENTION

It is an object of the present invention to provide a pneumatic tire, in which a footprint area can be maximized and an expansion and growth of the outer diameter can be prevented, and to a manufacturing method thereof.

In order to achieve the foregoing object, a pneumatic tire of the present invention which has a bias ply structure in which cords are disposed so as to cross each other between plural carcass layers and has aspect ratio of 55% or less and an outer diameter of 300 mm or less, wherein a cord angle of the carcass layer with respect to the tire circumferential direction ranges 27 to 37° at the center line position, and a surface shape of a tread portion is formed to be straight with respect to the tire width direction in a region of 60 to 75% of the tread width.

Thus, a cord angle in carcass layers ranges 27 to 37° at the center line position, a tread portion is formed to be straight with respect to the tire width direction in a region of 60 to 75% of the tread width, and both shoulders are coupled at the shortest distance therebetween. Thereby, in an inflated state, the tread surface presses the earth uniformly without becoming uneven. Thus, the footprint area can be maximized, moreover, an expansion and growth of the outer diameter can be minimized. Therefore, a pneumatic tire of the present invention is preferable for use in racing, especially for a racing cart, and can exhibit excellent driving stability.

In the present invention, the surface shape of the tread portion is the shape of the inside of a tire forming die. This surface shape of the tread portion is preferably made to be straight with respect to the tire width direction in the foregoing region. However, the surface shape may be a circular arc having a radius of more than 900 mm, that is substantially straight. Moreover, the region (straight region) forming the tread portion to be straight is preferably disposed so that the center of the region can be on the center line. In addition, the foregoing tread width corresponds to the distance between the points of intersection described below. These points of intersection are made by crossing a virtual line extending the border of the tread portion to the outside of the tire width direction and a virtual line extending the border of the side wall portion to the outside of the tire diameter direction.

The above-described pneumatic tire can be manufactured by the method described below. That is, the method of manufacturing the pneumatic tire of the present invention is for manufacturing a pneumatic tire adopting a bias ply structure in which plural carcass layers are disposed so that cords cross each other between the layers, and having an aspect ratio of 55% or less and an outer diameter of 300 mm or less. The method comprises the steps of: forming the carcass layer to be cylindrical, forming a green tire by winding a tread rubber extrusion having a belt state round the outer periphery of the carcass layer, expanding a diameter of the green tire while housing the green tire in a die so that a cord angle of the carcass layer with respect to the circumferential direction is set to a range from 27 to 37° at the center line position, and forming a surface shape of the tread portion formed of the tread rubber extrusion to be straight with respect to the tire width direction in the region of 60 to 75% of the tread width.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Figure 1:
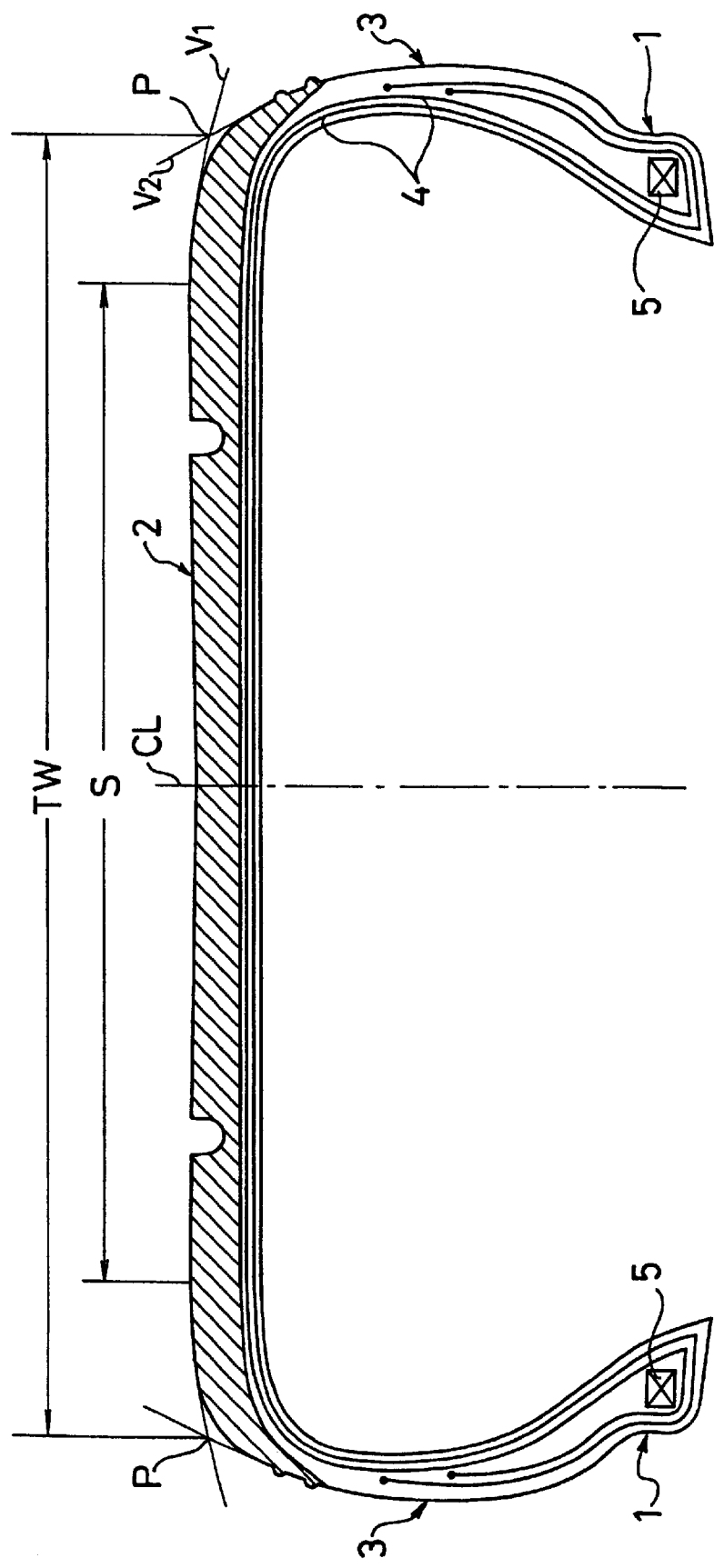
FIG. 1 is a sectional view showing a pneumatic tire of an embodiment of the present invention.

FIG. 1 shows an example of the pneumatic tire in an embodiment of the present invention. This tire adopts a bias ply structure and has aspect ratio of 55% or less, and an outer diameter of 300 mm or less. This tire is for use in a racing cart. Moreover, FIG. 1 shows a tire shape in a die.

In the drawing, reference numeral 1 denotes a bead portion, numeral 2 denotes a tread portion, numeral 3 denotes a side wall portion connecting the bead portion 1 and the tread portion 2. Two rubberized carcass layers 4 and 4 having plural organic fiber codes arranged in parallel are mounted between the bead portions 1 and 1 located on both sides of the pneumatic tire. In these carcass layers 4 and 4, the codes lean to the tire circumferential direction, and are disposed so as to cross each other between the layers. Both end portions of the carcass layers 4 and 4 of the tire width direction is respectively wound round a bead core 5 from the inside of the tire to the outside of the same.

In the above-described pneumatic tire, when a point of intersection P is determined by crossing a virtual line $V_1$ by which a circular arc forming the border of the tread portion 2 is extended to the outside of the tire width direction and a virtual line $V_2$ by which a circular arc forming the border of the side wall portion 3 is extended to the outside of the tire daimeter direction, the distance between these points of intersections P and P shows a tread width TW. And, the surface shape of the tread portion 2 is formed to be straight with respect to the tire width direction in a region S of which proportion is 60 to 75% of the tread width TW. This straight region S corresponds substantially to the tread footprint region.

As such, the surface shape of the tread portion 2 is formed to be straight in the region S of which proportion is 60 to 75% of the tread width TW, and both of the shoulders are coupled with the shortest distance therebetween. Accordingly, the tread surface is allowed to press the earth uniformly without becoming uneven in an inflated state, and the footprint area can be maximized. Moreover, by adopting a structure coupling both of the shoulders with the shortest distance, the tread portion 2 becomes hardly deformed to the outside of the tire diameter direction even though a great centrifugal force generated at high speed running is received. Thus, an expansion and growth of the outer diameter of the tire can be controlled as little as possible.

When the foregoing straight region S has a proportion of less than 60% of the tread width TW, an effect of increasing a footprint area cannot be obtained. On the other hand, when the proportion exceeds 75%, a good footprint shape distributing the uniform footprint pressure cannot be formed. Moreover, when the straight region S is set on the tread width TW, this straight region S is preferably disposed so that the center of the region can be on the center line CL.

Figure 2:
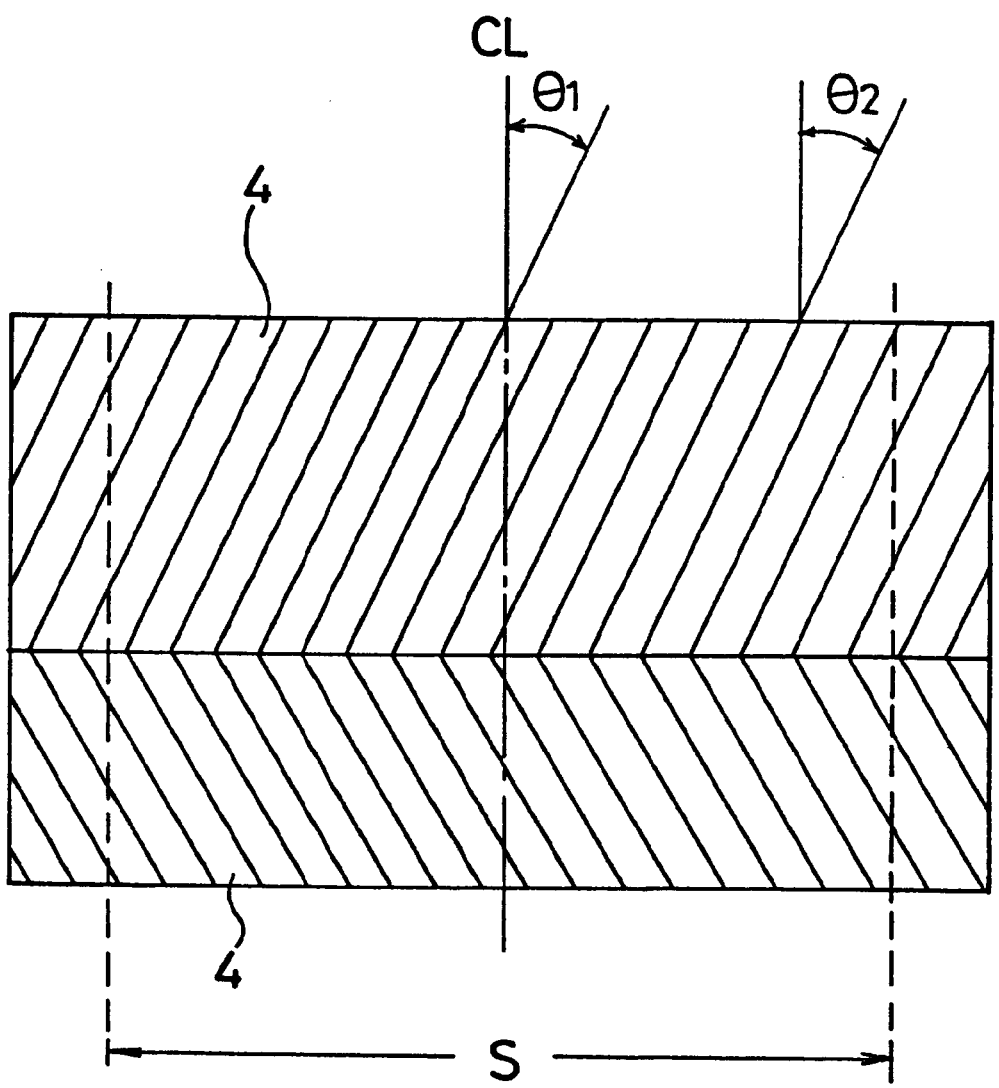
FIG. 2 is a plain view showing a carcass layer of the pneumatic tire shown in FIG. 1.

On the other hand, as for the inner structure of the tire, a cord angle $\theta_1$ of the carcass layer 4 with respect to the tire circumferential direction is set to a range from 27 to 37°, more preferably is set at 32° as shown in FIG. 2. When the cord angle $\theta_1$ is out of the above range, an effect of maximizing a footprint area in an inflated state cannot be obtained. Moreover, a cord angle $\theta_2$ of the carcass layer 4 with respect to the tire circumferential direction in an arbitrary position in the straight region S is set to a range from 95 to 105% of the cord angle $\theta_1$ in the center line CL. When the cord angle $\theta_2$ is out of the above range, the surface shape of the tread portion 2 tends to be uneven in an inflated state.

Figure 3:
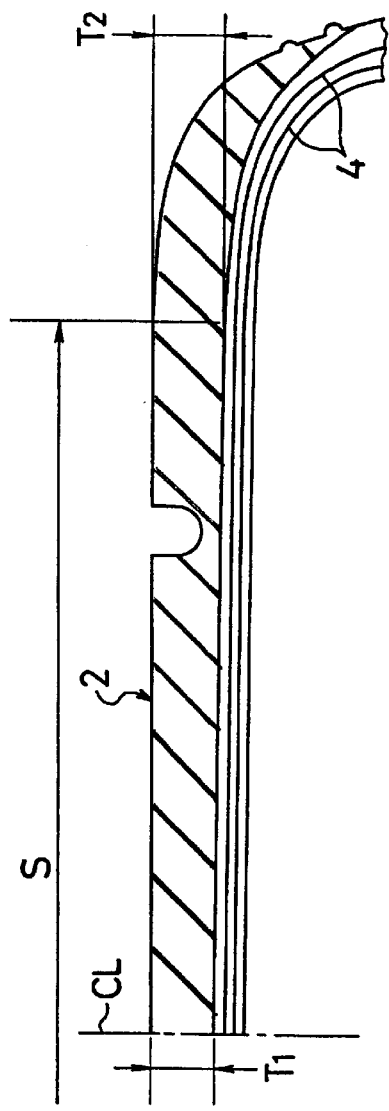
FIG. 3 is a sectional view showing an enlarged half of the tread portion of the pneumatic tire shown in FIG. 1.

As shown in FIG. 3, a tread rubber thickness $T_1$ in the center line CL is set to a range from 3 to 7 mm. In addition, a tread rubber thickness $T_2$ in the shoulder region of the tread portion 2 is set to a range from 90 to 110% of the tread rubber thickness $T_1$ in the center line CL.

In the tire of which the cord angle $\theta_1$ of the carcass layer 4 in the center line CL with respect to the tire circumferential direction is set to a range from 27 to 37° in such a manner, when the tread gauge distribution is made to be small, the tread surface forms a smooth curve in an inflated state, thus contributing to a increase of the footprint area. When the tread rubber thickness $T_2$ in the shoulder region is out of the above range, an effect of increasing the footprint area becomes insufficient. In addition, the foregoing shoulder region indicates a region having a width of 10 mm and locating its center on the end portion of the straight region S in the tire width direction.

Next, a manufacturing method according to the present invention will be described as follows. In manufacturing the foregoing tire, two carcass layers 4 and 4 are first formed to be cylindrical using a forming drum, and a tread rubber extrusion having a belt state is wound round the outer periphery of the carcass layers 4 and 4 to form a green tire.

Figure 4:
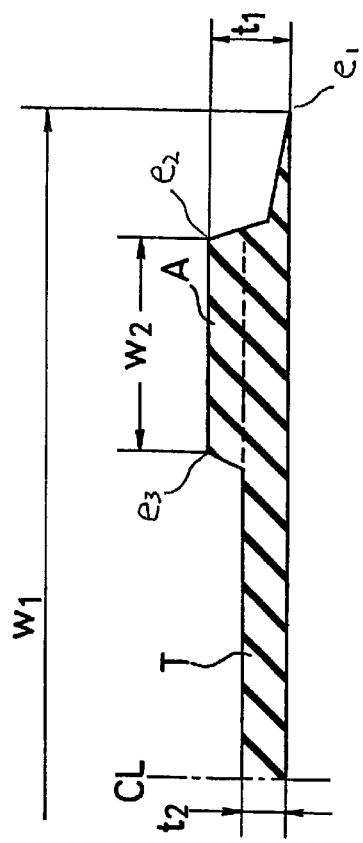
FIG. 4 is a sectional view showing a half of a tread rubber extrusion for use in manufacturing a pneumatic tire of the present invention.

As a tread rubber extrusion, the rubber shown in FIG. 4 is recommended. As shown in FIG. 4, the tread rubber extrusion T has protrusions A protruding to the outer periphery side of the tire along both edge portions. This protrusion A has an approximately trapezoidal shape in the cross section. In such a manner, the protrusions A having an approximately trapezoidal shape are provided on the tread rubber extrusion T along both edge portions thereof. Thereby, a rubber flow of the tread portion in curing is allowed to be smooth. Accordingly, an angle change of the carcass cord turns good and a tread rubber thickness after being cured can be uniform. As a result, defects occurred in curing can be reduced and the tire having an even shape can be obtained.

That is, a racing tire adopting a bias ply structure and having an aspect ratio of 55% or less expands its diameter with the internal pressure load in a die at the time of curing process. And the inner structure of the tire manufactured is determined at the step where this expansion of the diameter is completed. Accordingly, in case that a rubber flow is not smooth, a defective rubber flow, an air collection and a defective angle change of the carcass cord occurs, and this results in a defective tire shape in an inflated state. To this, heretofore, a protrusion having a triangle shape in the cross section has been provided around the shoulder portion of the tread rubber extrusion, and a rubber flow has been adjusted by adjusting a thickness of the protrusion. However, the triangle protrusion as described above has not enabled a rubber flow in the pneumatic tire of the present invention to be improved.

The tread rubber extrusion T has a thickness of $t_2$ in the center portion. And, from the most outer edge $e_1$, passing through one or two inflection points, $e_2$ is specified at a position where the distance from the edge $e_1$ is 15 to 25 mm to the inside of the tire width direction to have a whole thickness $t_1$. Also, the extrusion T maintains the thickness $t_1$ in the width $w_2$. In the edge $e_3$ at the center side of the protrusion A, a thickness gradually decreases in a width of 10 to 20 mm to the thickness $t_2$. This tread rubber extrusion T is symmetric at the center line CL, and has the width $w_1$ as a whole.

In the present invention, a ratio ($w_2/w_1$) of the width $w_2$ of the protrusion A to the width $w_1$ of the tread rubber extrusion preferably ranges 0.15 to 0.25, and a ratio ($t_2/t_1$) of the thickness $t_2$ of the center portion of the tread rubber extrusion T to the total thickness $t_1$ of the tread rubber extrusion T and the protrusion A preferably ranges 0.55 to 0.65.

In case that the ratios $w_2/w_1$ and $t_2/t_1$ are out of the above range, a uniform thickness of the tread rubber becomes hard to be obtained after being cured. That is, when the ratio $w_2/w_1$ is less than 0.15, the gauge of the shoulder portion tends to be relatively thin, on the contrary, when the ratio $w_2/w_1$ exceeds 0.25, the gauge of the center portion tends to be uneven. On the other hand, when the ratio $t_2/t_1$ is less than 0.55, the gauge of the shoulder portion tends to be relatively thick, on the contrary, when the ratio $t_2/t_1$ exceeds 0.65, the gauge of the center portion tends to be relatively thick.

In addition, the center position of the width $w_2$ of the protrusion A desirably accords approximately with the point of intersection P crossing the virtual line $V_1$ extending the border of the tread portion 2 to the outside of the tire width direction and the virtual line $V_2$ extending the border of the side wall portion 3 to the outside of the tire diameter direction. However, a little gap may be occurred depending on the shape of the die shoulder portion, the tire size (dimension) and the like. When the protrusion A is separated from the tire shoulder portion, the above-described effect of improving a rubber flow cannot be obtained.

Next, the tread rubber extrusion T is wound round the outer periphery side of the carcass layers 4 and 4 to form a green tire. Then, the green tire is inserted to the inside of the die equipped with a cavity according approximately with the outer surface shape of a finished tire. This die is formed so that the inner surface shape can be straight to the tire width direction in the region of 60 to 75% of the tread width. And, at the time of curing to form, the green tire is made to expand in the die using a bladder. Thereby, a cord angle of the carcass layers 4 and 4 with respect to the tire circumferential direction is allowed to range 27 to 37° at the center line position, and the surface shape of the tread portion 2 formed of the tread rubber extrusion T is formed to be straight in the region of 60 to 75% of the tread width.

According to the above-described manufacturing method of the pneumatic tire, in manufacturing the tire formed to be straight with respect to the tire width direction in the region of 60 to 75% of the surface shape of the tread portion 2, the tread gauge can be uniform, the fluctuation of the carcass cord angle can be minimized, and the occurrence of defects in curing caused by a defective rubber flow can be prevented.

EXAMPLE

In a tire having a size of 7.1×11.0–5 and a bias ply structure for use in a racing cart, a tire of the present invention, comparative tires 1 and 2 and conventional tires 1 to 3 are respectively produced so as to have respectively different tire structures in variety as follows. In addition, each tire diameter is 289 mm. Tire of the present invention:

The surface shape of the tread portion is formed to be straight with respect to the tire width direction in the region of 70% in the center of the tread width, and the cord angle of the carcass layers with respect to the tire circumferential direction in the center line (carcass product angle), is set at 32°.

Comparative Tire 1

Other than that the carcass product angle is set at 26°, the same structure as that of the tire of the present invention is adopted.

Comparative Tire 2

Other than that the carcass product angle is set at 38°, the same structure as that of the tire of the present invention is adopted.

Conventional Tire 1

The surface shape of the tread portion is formed to be convex with respect to the tire width direction in the region of 70% of the center of the tread width, and the carcass product angle is set at 32°. In addition, the curvature radius of the convex shape is set at 900 mm.

Conventional Tire 2

Other than that the carcass product angle is set at 26°, the same structure as that of the conventional tire 1 is adopted.

Conventional Tire 3

Other than that the carcass product angle is set at 38°, the same structure as that of the conventional tire 1 is adopted.

These tires for testing were fitted to wheels having a rim width of 8 inch, and were disposed in a plain under the conditions that air pressure is 100 kPa and load is 0.45 kN. Then, each of the footprint area was measured. The results are shown in Table 1. The evaluation results are shown by indexes when the tire of the present invention is 100. As this index value is higher, the footprint area in an inflated state is meant to be larger.

TABLE 1

|  | Tire of the present invention | Comparative tire 1 | Comparative tire 2 | Conventional tire 1 | Conventional tire 2 | Conventional tire 3 |
| --- | --- | --- | --- | --- | --- | --- |
| Tread surface shape | straight shape | | | convex shape | | |
| Carcass product angle | 32° | 26° | 38° | 32° | 26° | 38° |
| Footprint area (index) | 100 | 85 | 80 | 95 | 82 | 77 |

As shown in this Table 1, the tire of the present invention greatly increased its footprint area in comparison with the comparative tire 1 and 2 and the conventional tires.

Although the preferred embodiment of the present invention has been described in detail, it should be understood that various changes, substitutions and alternations can be made therein without departing from spirit and scope of the inventions as defined by the appended claims.

What is claimed is:

1. A pneumatic racing cart tire adopting a bias ply structure in which plural carcass layers are disposed so that cords cross each other between the layers, and having an aspect ratio of 55% or less and an outer diameter of 300 mm or less, wherein a cord angle to a tire circumferential direction of each of said carcass layers is set to a range from 27 to 37° at a position of a center line of the tire, and a surface shape of a tread portion is formed to be straight to a tire width direction only in a region of 60 to 75% of a tread width determined symmetrically of the center line, wherein the cord angle of said carcass layer at a position in the straight region of said tread portion other than at said center line is set to a range from 95 to 105% of the cord angle of said carcass layer at the position of said center line and the tread rubber thickness in the shoulder region of said tread portion is set to a range from 90 to 110% of the tread rubber thickness at said center line.

2. A manufacturing method of a pneumatic racing cart tire adopting a bias ply structure in which plural carcass layers are disposed so that cords cross each other between the layers, and having an aspect ratio of 55% or less and an outer diameter of 300 mm or less, the method comprising the steps of:

forming said carcass layers to be cylindrical;

forming a green tire by winding a tread rubber extrusion having a belt state around the outer periphery side of the carcass layers;

expanding a diameter of the green tire while housing the green tire in a die;

setting the cord angle of each of said carcass layers with respect to the tire circumferential direction to a range from 27 to 37° at a position of the center line position; and forming a surface shape of the tread portion formed of said tread rubber extrusion to be straight with respect to the tire width direction only within a region of 60 to 75% of the tread width determined symmetrically of the center line; and curing said green tire to form said pneumatic racing cart tire, wherein the cord angle of said carcass layer at a position in the straight region of said tread portion other than at said center line is set to a range from 95 to 105% of the cord angle of said carcass layer at the position of said center line and the tread rubber thickness in the shoulder region of said tread portion is set to a range from 90 to 110% of the tread rubber thickness at said center line.

3. The manufacturing method of a pneumatic racing cart tire as claimed in claim 2, wherein protrusions protruding with respect to the outer periphery side of the tire are provided on the tread rubber extrusion along both edge portions thereof, the protrusions having a trapezoidal shape in the cross section.

4. The manufacturing method of a pneumatic racing cart tire as claimed in claim 3, wherein a ratio ($w_2/w_1$) of the width $w_2$ of said protrusion to the width $w_1$ of said tread rubber extrusion is set to a range from 0.15 to 0.25, and a ratio ($t_2/t_1$) of the thickness $t_2$ of the center portion of said tread rubber extrusion to the total thickness $t_1$ of said tread rubber extrusion and said protrusion is set to a range from 0.55 to 0.65.

* * * * *